(12) United States Patent
Miller

(10) Patent No.: US 7,175,758 B2
(45) Date of Patent: *Feb. 13, 2007

(54) METHOD AND APPARATUS FOR RECYCLING WASH CHEMICALS

(75) Inventor: Robert L. Miller, Florence, CO (US)

(73) Assignee: Jeffrey S. Melcher, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/397,730

(22) Filed: Apr. 5, 2006

(65) Prior Publication Data

US 2006/0207947 A1  Sep. 21, 2006

Related U.S. Application Data

(60) Division of application No. 10/939,335, filed on Sep. 14, 2003, now Pat. No. 7,060,189, which is a continuation of application No. 10/636,808, filed on Aug. 8, 2003, now Pat. No. 6,932,910.

(60) Provisional application No. 60/411,382, filed on Sep. 18, 2002, provisional application No. 60/408,281, filed on Sep. 6, 2002, provisional application No. 60/406,059, filed on Aug. 27, 2002, provisional application No. 60/404,403, filed on Aug. 20, 2002, provisional application No. 60/402,526, filed on Aug. 12, 2002.

(51) Int. Cl.
   *B01D 29/56* (2006.01)

(52) U.S. Cl. ............ 210/97; 210/209; 210/167; 210/255; 210/258; 210/262; 210/416.1; 210/532.1; 134/10

(58) Field of Classification Search .......... 210/255
   See application file for complete search history.

(56) References Cited

U.S. PATENT DOCUMENTS

| | | | |
|---|---|---|---|
| 48,559 A | 7/1865 | Kaufman |
| 56,197 A | 7/1866 | Ferris |
| 60,455 A | 12/1866 | Vander Weyde |
| 77,746 A | 5/1868 | Mathews |
| 116,515 A | 6/1871 | Weare |
| 370,674 A | 9/1887 | Bang et al. |
| 389,427 A | 9/1888 | Wells et al. |
| 542,586 A | 7/1895 | Eassie et al. |
| 621,803 A | 3/1899 | Felts |
| 645,190 A | 3/1900 | Schantz |
| 669,335 A | 3/1901 | Behrend |
| 673,868 A | 5/1901 | Henderson |
| 690,082 A | 12/1901 | Snyder |
| 1,290,820 A | 1/1919 | Winkel |

(Continued)

OTHER PUBLICATIONS

Cyclonator standard filtration weir, www.cyclonator.com.

(Continued)

*Primary Examiner*—Robert James Popovics
*Assistant Examiner*—T. Woodruff
(74) *Attorney, Agent, or Firm*—Jeffrey S. Melcher; Manelli Denison & Selter, PLLC

(57) ABSTRACT

The invention relates to a method and apparatus for recycling a wash solution used in powder coating which uses filters. The invention also relates to methods and apparatuses for recycling wash solutions used in spray washing, steam cleaning or car washes using filters.

23 Claims, 16 Drawing Sheets

U.S. PATENT DOCUMENTS

| | | |
|---|---|---|
| 1,320,324 A | 10/1919 | Dunkle |
| 1,442,306 A | 1/1923 | Stonebraker |
| 1,988,612 A | 1/1935 | Stindt |
| 2,582,401 A | 1/1952 | Stinson |
| 2,979,062 A | 4/1961 | Umbricht et al. |
| 3,386,181 A | 6/1968 | Steinacker |
| 3,473,480 A | 10/1969 | Kollmai |
| 3,945,918 A | 3/1976 | Kirk |
| 4,297,213 A | 10/1981 | Airey et al. |
| 4,753,735 A | 6/1988 | Figiel |
| 4,913,345 A | 4/1990 | Setter |
| 4,975,199 A | 12/1990 | Woster et al. |
| 5,040,950 A | 8/1991 | Dalquist et al. |
| 5,080,793 A | 1/1992 | Urlings |
| 5,417,855 A | 5/1995 | Gershenson |
| 5,496,469 A | 3/1996 | Scraggs et al. |
| 5,500,976 A | 3/1996 | Rohrbacher et al. |
| 5,501,396 A | 3/1996 | Rohrbacher et al. |
| 5,766,465 A | 6/1998 | Yamamoto et al. |
| 5,993,739 A | 11/1999 | Lyon |
| 5,996,604 A | 12/1999 | Doelle et al. |
| 6,082,631 A | 7/2000 | Aslakson |
| 6,234,409 B1 | 5/2001 | Aslakson |
| 6,302,967 B1 | 10/2001 | Rohrbacher et al. |
| 6,592,753 B2 | 7/2003 | Lee |
| 6,932,910 B2 * | 8/2005 | Miller .................. 210/743 |
| 7,060,189 B2 * | 6/2006 | Miller .................. 210/743 |
| 7,074,337 B2 * | 7/2006 | Miller .................. 210/744 |
| 2001/0022323 A1 | 9/2001 | Aslakson |
| 2004/0094490 A1 * | 5/2004 | Miller .................. 210/805 |
| 2005/0029200 A1 * | 2/2005 | Miller .................. 210/743 |
| 2005/0230325 A1 * | 10/2005 | Miller .................. 210/770 |
| 2006/0180530 A1 * | 8/2006 | Miller .................. 210/167 |
| 2006/0207947 A1 * | 9/2006 | Miller .................. 210/743 |

OTHER PUBLICATIONS

Powder-X Pretreatment Station, Powder-X Coating Systems, Inc., www.powder-x-.com.
Rapid Pretreatment Station, www.rapidengineering.com.
PKG Equipment, Inc., www.pkgequipment.com.
Water Treatment Tech Equipment, MFG.
Pressure Island.
Arkal Filtration.
ADF-Liquid Filtration.
Kemco Systems.
Tiger Enterprises, 39126 Alston Ave., Zephyrhills, Fl 33542.
Mountain Technology, Idaho Springs, Hydro Engineering (division of Mountain Technology, www.mttechnology.com/hydro.htm, pages relating to CFS3 Solids Filter, CMAFU-2 Filtration Unit, ACF3 Polishing Filter, and general pages relating to all filter systems.

* cited by examiner

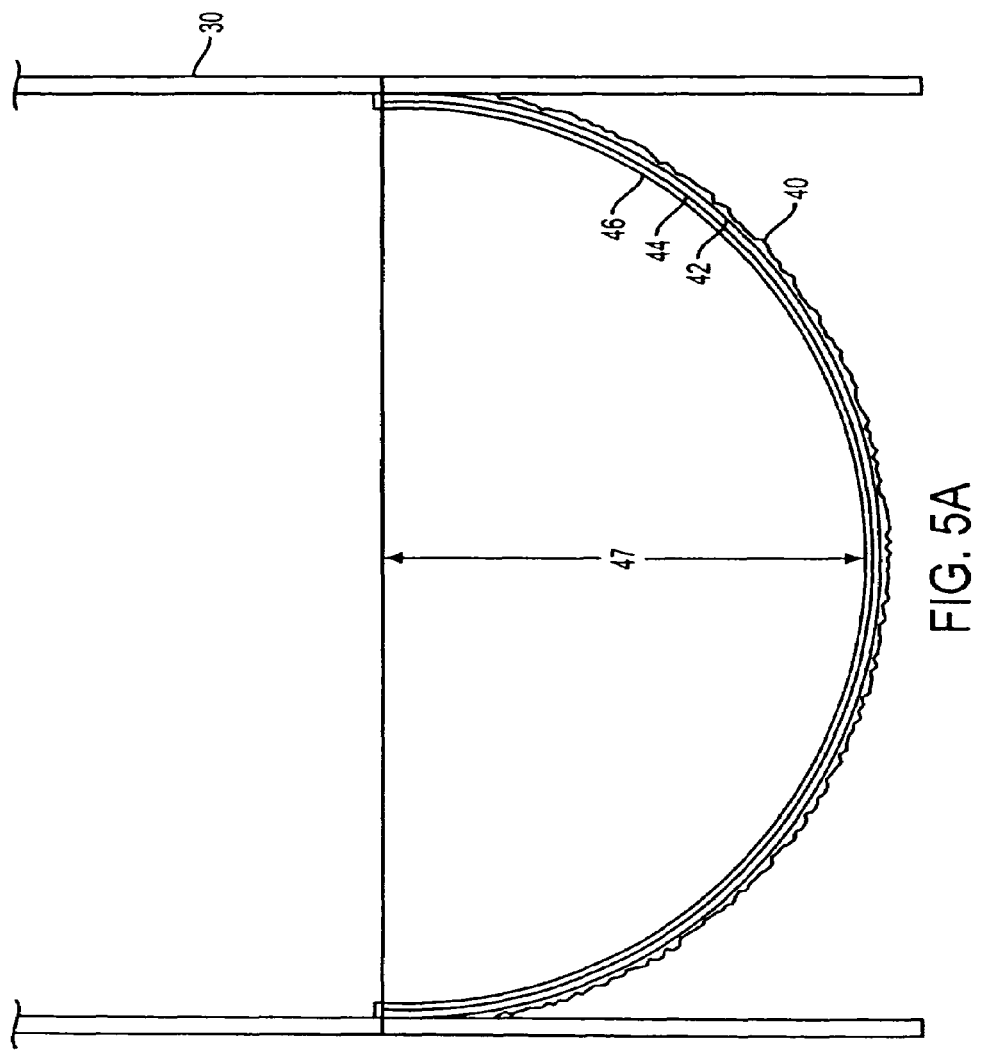

METHOD AND APPARATUS FOR RECYCLING WASH CHEMICALS

This application is a Divisional of U.S. application Ser. No. 10/939,335, filed Sep. 14, 2003, now U.S. Pat. No. 7,060,189 which is a Continuation of U.S. Ser. No. 10/636,808, filed Aug. 8, 2003, now U.S. Pat. No. 6,932,910 which claims priority to U.S. Provisional Application Nos. 60/411,382, filed Sep. 18, 2002; 60/408,281, filed Sep. 6, 2002; 60/406,059, filed Aug. 27, 2002; 60/404,403, files Aug. 20, 2002; and 60/402,526, filed Aug. 12, 2002, the complete disclosures of which are incorporated herein by reference.

FIELD OF THE INVENTION

The invention relates to a method and apparatus for recycling a wash solution used in powder coating. The invention also relates to methods and apparatuses for recycling wash solutions used in spray washing, steam cleaning or car washes.

BACKGROUND OF THE INVENTION

The method of powder coating an object to form a paint coating thereon is well known. Such powder coating techniques require a washing step to remove oils and dirt that would inhibit the bonding of the power coating to the surface of the object to be coated. It is now well known to use a power washer to dislodge oil and dirt from the object to be coated. Depending on the geographic location, iron phosphate, potassium phosphate and/or sodium phosphate (hereinafter referred to as phosphate collectively) is usually added to the wash solution used in spray washing to facilitate the removal of the oil and dirt.

A typical powder coating company uses from 15,000 to 18,000 gallons of water and 125 to 175 gallons of phosphate per month in the washing process of powder coating. This used wash solution of wash water and chemicals is usually discharged through municipal waste systems.

There have been attempts to recycle the used wash solution. One such conventional recycling apparatus is sold commercially under the Cyclonator™ name. A description can be found on the internet at www.cyclonator.com. This system uses numerous hoses to and from a specially designed washing platform, an additional separate filtering tank to remove larger debris and oils, a special holding tank, and two vacuum canister type filters that require expensive filters. This recycling apparatus provides no visual monitoring ability except for vacuum gauges, has no pH monitoring nor automatic adjustment capability, and the location of the unit has to be in close proximity to the wash platform and the power washer. Furthermore, the recycling apparatus is difficult to maintain, requires a large area of space and numerous extra equipment at additional cost. Moreover, the vacuum used to force the wash solution through a filter can undesirably force dirt through filters.

There is a need for an improved recycling apparatus that does not require a vacuum, provides easy visual inspection of the filters during operation, is easy to maintain and operate, is compatible with the wide range of wash platforms currently used, and can be scaled to any size powder coating operation.

BRIEF DESCRIPTION OF THE DRAWINGS

FIG. 5A illustrates a cutaway, side view of a filter assembly.

DETAILED DESCRIPTION OF PREFERRED EMBODIMENTS

The present invention will now be described with reference to preferred embodiments as shown in the Figures. The claimed invention is not limited to these preferred embodiments.

Figure 1:
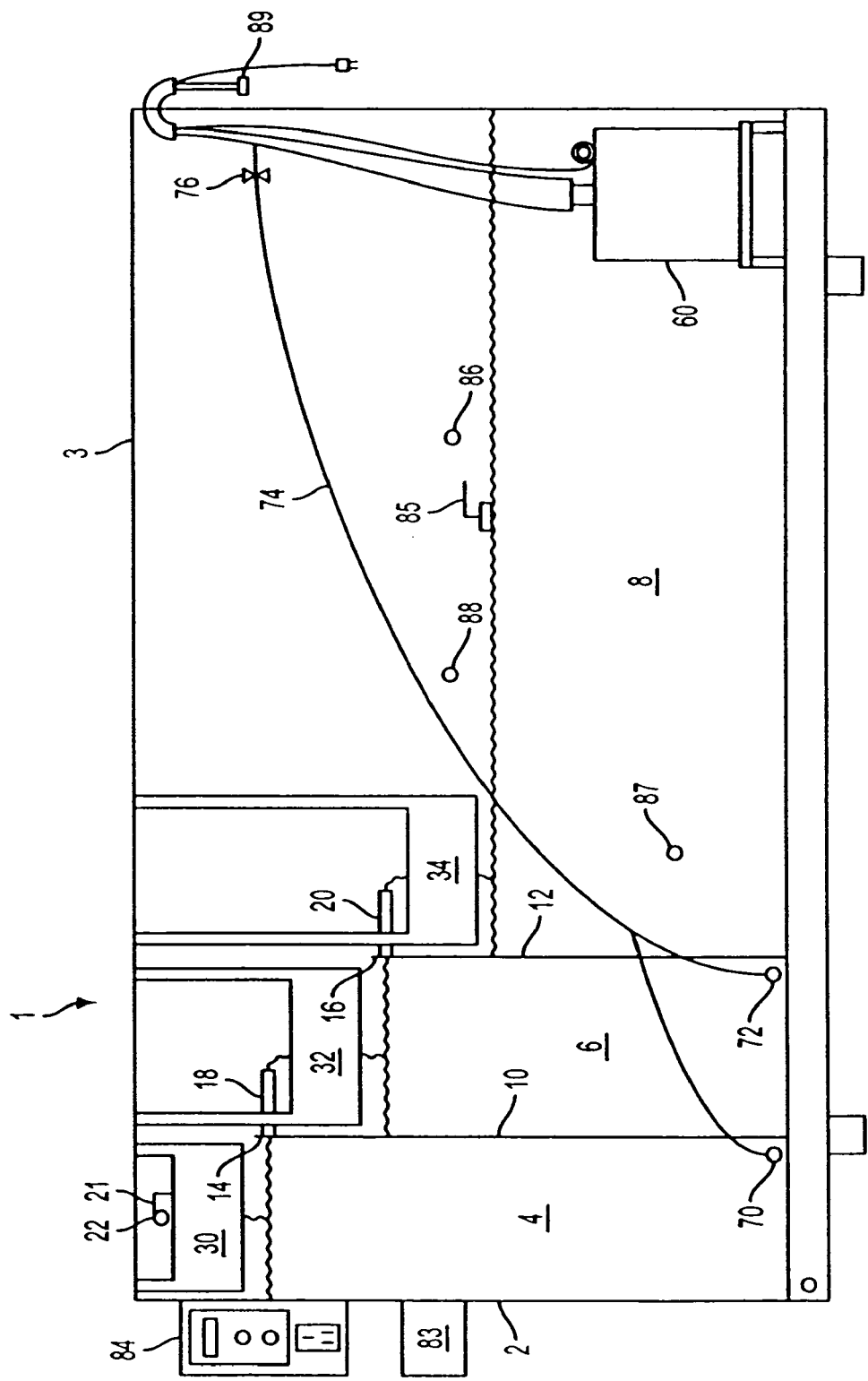
FIG. 1 illustrates a side view of the recycling apparatus.

As shown in FIG. 1, the recycling apparatus 1 comprises a main tank 2 that is about three feet wide, about three feet deep, and about five feet long. The exemplary main tank 2 is sized to operate with one standard spray washer operating at a maximum of about 5 gallons per minute. The main tank 2 can be sized for any desired flow rate and number of spray washers.

The main tank 2 is constructed of 14 gauge mild steel, but can be constructed of any desired material that is suitable to hold the used wash solution. Examples of suitable materials include, but are not limited to, metals, alloys, rubbers, plastics, glass, coated wood, or fiberglass. Preferably, if metal parts are utilized in the recycling apparatus 1, the metal parts are powder coated to prevent rust.

Wash solutions are well-known and any conventional wash solution can be used in the present recycling apparatus. The wash solution is usually acidic. A preferred wash solution contains phosphate. The wash solution is preferably free-of chemicals that cannot be recycled, such as butyl cellusolve (a glycol ether), which can vaporize or break down at 175° F. and cause undesirable vapors during spray washing. Preferably, the wash solution is free-of heavy metals such as molybdate, that are environmentally unfriendly. A suitable commercially available phosphate that can be combined with water to form the wash solution is sold under the name DuBoise Diversy/Lever, secure steam ultra.

The main tank 2 is split into three separate tanks for holding the wash solution, holding tanks 4 and 6, and recycled wash solution tank 8, by baffles 10 and 12. The baffles can be formed from the same material as the holding tank, or any material suitable to hold wash solution. If desired, separate tanks can be used instead of splitting one large tank into smaller tanks with the use of baffles, as described herein below.

Each tank 4, 6 and 8 has an associated filter assembly 30, 32 and 34. Three tanks and filter assemblies is the preferred arrangement. However, if more filtering is desired, the number of tanks and associated filter assemblies can be increased. While not preferred, if less filtering is desired, the number of holding tanks can be reduced to one.

Figure 2:
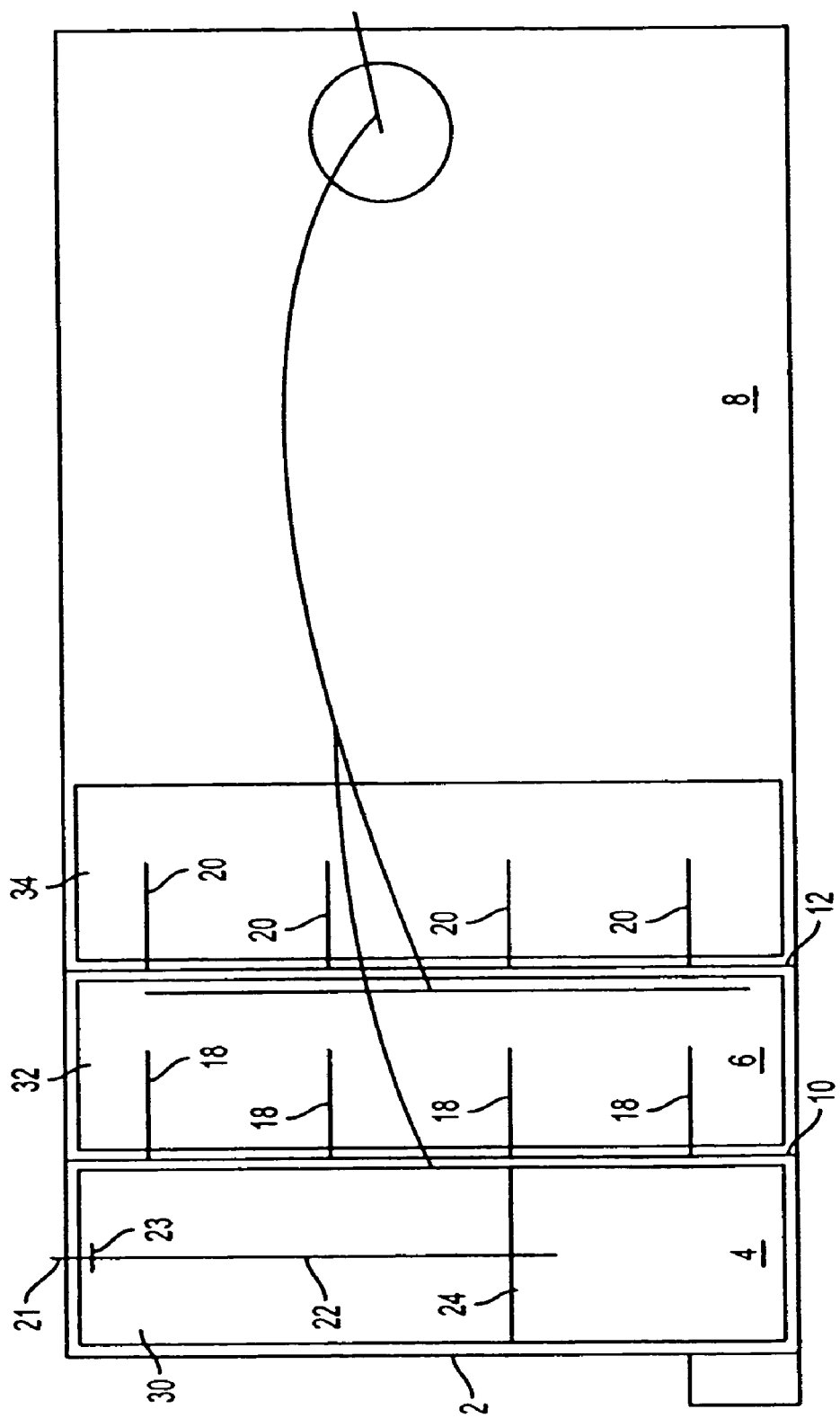
FIG. 2 illustrates a top view of the recycling apparatus.
Figure 4:
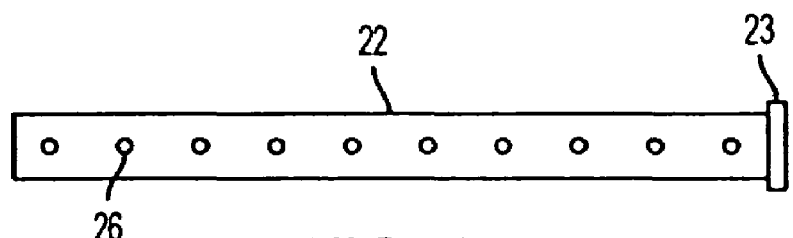
FIG. 4 illustrates a side view of a distributing pipe.

The first holding tank 4 has a used wash solution inlet 21 connected to a distributing pipe 22 using a quick disconnect 23. As shown in FIG. 4, the distributing pipe 22 is about 2 to 4 feet in length, about 1 inch in diameter and has a plurality of drain holes 26 spaced the length that are about ¼ to about ⅜ inch in diameter. The distributing pipe 22 is supported by a support 24. The size and length of the distributing pipe 22 and the size and number of drain holes 26 can be varied as desired for the particular application. Preferably, the distributing pipe 22 is constructed to evenly distribute the used wash solution over the filter assembly 30 to maximize the life of the filter. The end of the distributing pipe 22 can be capped or left open as desired. The distributing pipe 22 can be formed from any material that is suitable for holding wash solution. The baffles 10 and 12 are staggered in height, with the height of baffle 10 being higher than baffle 12 so that the wash solution level in tank 4 is higher than the wash solution level in tank 6 and the wash solution level in tank 6 is higher than the wash solution level in tank 8. The baffles 10 and 12 each have associated outlets 14 and 16 located about 1 inch below the top of each baffle through which the wash solution can flow. The outlets 14 and 16 each have associated 1 inch diameter pipes 18 and 20 respectively. As shown in FIG. 2, there are four outlets 14 having four associated pipes 18 and four outlets 16 having associated pipes 20 that spaced apart the width of the main tank 2. The pipes 18 and 20 are about 1 inch in diameter and can be formed from any material that is suitable for holding wash solution. The pipes 18 and 20 terminate at about the mid point axis of the respective tank 6 and 8. The size, number and location of pipes 18 and 20 can be varied as desired. Preferably, the size, number and location of the pipes 18 and 20 are such that the wash solution is spread evenly over the filter assemblies to maximize the filter lifetime. If desired a conduit can be used in place of the pipes 18 and 20, which spreads the solution evenly over the filter assembly.

Figure 5B:
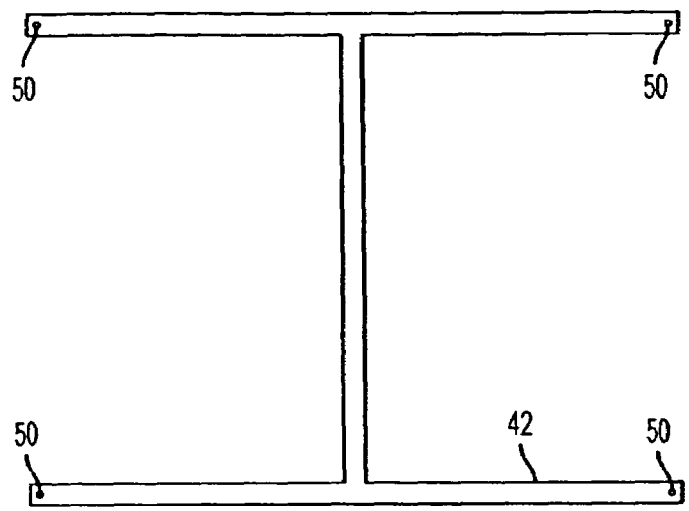
FIG. 5B illustrates a top view of the bottom strap for holding a filter.
Figure 5C:
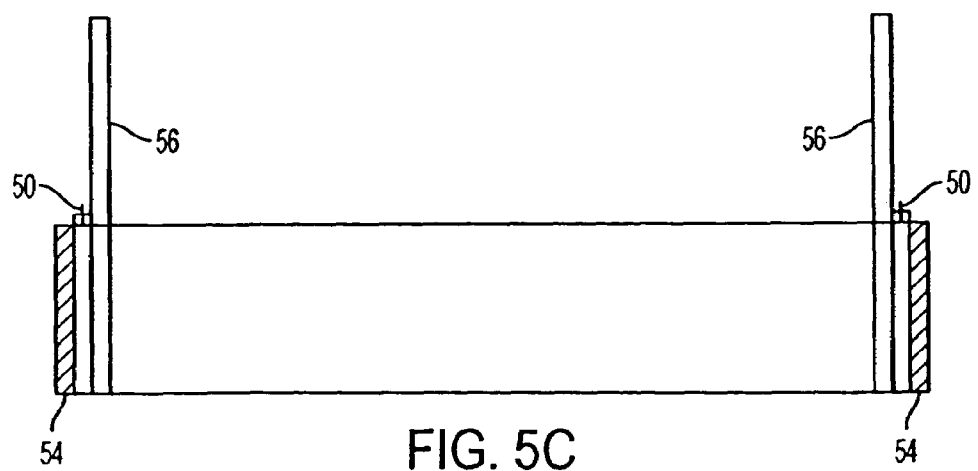
FIG. 5C illustrates an end view of a filter assembly.

Each tank 4, 6 and 8 has an associated filter assembly 30, 32 and 34. The filter assemblies 30, 32 and 34 are sized to removably fit within their respective tank, as shown in FIGS. 1 and 2. As shown in FIGS. 5A–5C, the filter assembly 30 comprises 2 inch expanded steel mesh 40 in the shape of a half circle having a 4 inch diameter 42, a ⅛×1 inch I-shaped strap 42 that can be welded to the steel mesh 40, a filter 44, and two ⅛×1 inch straps 46 at each end of the filter assembly 30. The filter 44 is held in place by fastening the straps 46 to the I-shaped strap 42 using bolts 50. While the use of bolts and straps are shown in the Figures, the filter can be held in place using any suitable means, such as clamps, clasps, screws, and ties. The ends of the filter assembly 30 are sealed using 4×8 inch plates 54. The filter assembly 30 is removably held in place within tank 4 using the four mounting straps 56 that can be clasped to the main tank walls 2. The mounting straps can be held in place by gravity such that the filter assembly can easily be raised out of the tank, or held in place by using any suitable fastening means, such as bolts, screws, clasps and clamps. Any number of mounting straps can be used. Alternatively, instead of mounting straps 56, the filtering assembly can rest on stops placed in the tank to hold it in place instead of hanging the filtering assembly on mounting straps 56. Each of the filter assemblies 32 and 34 are similar in construction to the filter assembly 30, except for the length of the mounting straps 56. The mounting straps 56 should be of a length such that during operation wash solution flows from the pipes 22, 18 and 20 into the respective filter assemblies and filtered wash solution drops from the filter assemblies into their respective tanks.

The filter assemblies and tanks are constructed and arranged such that during operation, the filtered wash solution drops about 1 inch to 30 inches, more preferably from about 2 inches to about 24 inches, more preferably from about 3 inches to about 12 inches, and most preferably about 6 to about 8 inches, before contacting the surface of the wash solution in the respective tank to provide aeration. The height of the filtering assembly can easily be adjusted by adjusting the length of the mounting straps 56 and/or adjusting the height of the baffles and 10 and 12 and their associated outlets 14 and 16.

The size and structure of the filter assembly can be varied as desired. Preferably, the size of the filter should be such that at least a 5 gallon per minute flow rate is provided under ambient pressure and gravity.

The preferred filter assembly shown uses a flat rolled filter 44, which can be purchased in spools three feet wide and 150 feet long and easily cut to the proper length. The filters usually last about 1 week in duration before changing is required, but should be monitored daily. To change the filter in filter assembly 30, the distributing pipe 22 is first removed by removing the quick disconnect 23 and the mounting straps 56 are then unclasped and filter assembly 30 lifted out. To change the filters in filter assemblies 32 and 34, the mounting straps 56 are unclasped and the filter assembly 32 or 34 tilted to clear the respective pipe 18 or 20 and lifted out.

Once the filter assembly is out of the tank, the filter 44 can be easily replaced by removing the bolts 50 and lifting the used filter 44 out the filter assembly. A new filter 44 can be easily cut to the proper length from a spool of filter, placed in the filter assembly, and securely mounted using the straps 46 and bolts 50. The filter assembly can be easily replaced in the tank by reversing the steps for removing the filter assembly.

The preferred filter 44 is inexpensive and easily obtained from commercial manufacturers or from a filter supply company. The spool is usually three (3) feet wide and one hundred fifty (150) feet long. Examples of preferred commercially available filter materials include, but are not limited to, the BR-60 and BR-80 series from Mountain States Filter, Colorado. While inexpensive flat sheets of filter cloth are preferred filters, any suitable filter material can be used as desired for the particular application.

The filter can be selected by the end user to provide the desired level of filtering based on the particular application. It has been found that filters having a size of less than 10 microns are suitable. A preferred arrangement is the use of a filter having a size of about 3 to 8 microns in the filter assembly 30, and about 1 microns or less in each of the filter assemblies 32 and 34. However, the size of the filter can be varied as desired for the particular application.

The first and second baffles 10 and 12 can optionally contain a separator shield that is designed to isolate oils, which can then be mechanically or manually removed.

Figure 6:
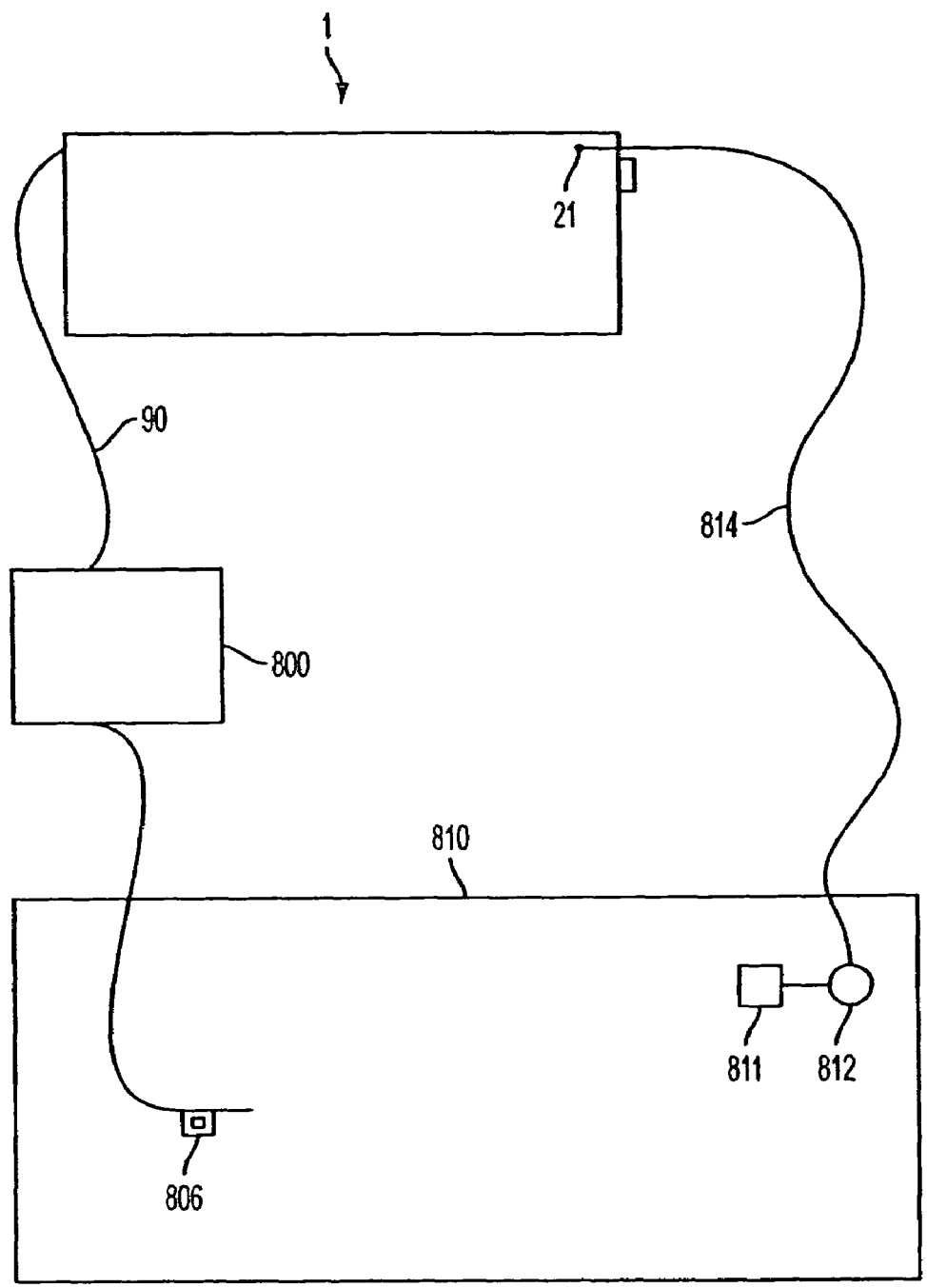
FIG. 6 illustrates a spray wash assembly utilizing a recycling apparatus.

The recycled wash solution tank 8 contains the filtered recycled wash solution that can be reused in the spray washer. As shown in FIGS. 1 and 6, a ¼ hp submersible pump 60 is located in the recycled wash solution tank 8, which pumps the recycled wash solution to the power washer 100 via hose 90. The sump pump is controlled by panel 84. While a sump type pump is shown, any suitable pump can be used, such as an air operated diaphragm style pump that is external or internal to the tank 8. In the air operated diaphragm style pump, no electricity is involved, which further enhances the safety of the apparatus. Hose 90 is connected to the hose connection 89.

Figure 3:
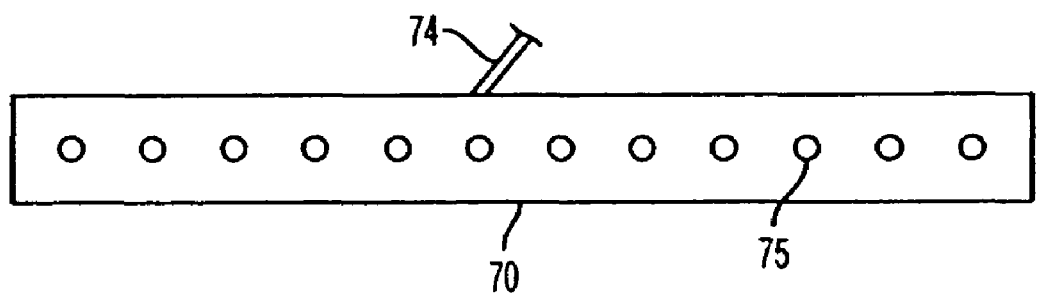
FIG. 3 illustrates a side view of a wash solution agitator.

To prevent sediment buildup in the tanks 4, 6 and 8, the pump 60 is connected to agitators 70 and 72 via line 74 to pump recycled wash solution in tank 8 to the holding tanks 4 and 6. If desired a separate pump can be used to feed the agitators 70 and 72. A valve 76 regulates the amount of wash solution pumped to the agitators 70 and 72. As shown in FIGS. 1 and 3, the agitator 70 is formed from a 1 inch square pipe that has been capped at both ends. A plurality of ¼ to ⅜ inch holes 75 are spaced the length of the agitator 70. The agitator 70 is about the same width of the holding tank 4. The size, shape and number of the agitators 70 and 72 can be varied as desired for the particular application. If more agitation is desired, a larger agitator, multiple agitators or smaller holes 75 can be used. If less agitation is desired, a smaller agitator or larger holes 75 can be used. When recycled wash solution is pumped into the agitator 70, it is sprayed out of the holes 75 and agitates the wash solution present in the holding tank 4. The agitator 72 works in the similar manner. If precipitates form in the recycled wash solution tank 8, they can be pumped into the holding tanks 4 and/or 6 via the agitators 70 and 72 and then caught by the respective filter assemblies. The agitators can be run continuously, even when the spray washer is not used, to remove undesirable precipitates and prevent sediment buildup in the tanks.

While recycling recycled wash solution from the recycled wash solution tank 8 is preferred for agitation and removal of precipitates, wash solution from other tanks can be utilized, such as using wash solution in the second holding tank 6 to supply the agitator in the first holding tank 4.

The recycling apparatus 1 preferably contains a water level monitor 85 in the recycled wash solution tank 8 to alert the user of low wash solution conditions. If desired, the water level monitor 85 can be connected to a water supply to automatically add water to the recycled wash solution tank 8 through inlet 86 as needed. The water level monitor 85 can be any conventional water level monitor, such as commonly used in toilets or the well-known water levelers used in the commercially available Swamp Cooler™.

During operation, the recycling apparatus 1 is connected to a power washer 800 using a hose 90. The sump pump 60 pumps recycled wash solution to the power washer 800 at a pressure of about 5 pounds per square inch (psi) or greater. The capacity of the sump pump 60 can be adjusted to match the input pressure requirements of the particular spray washer being utilized. The power washer 800 heats the wash solution to any desired pressure and temperature, for example, about 180 to about 220° F. and about 1500 to about 3000 psi. The object to be washed is sprayed with the heated pressurized wash solution in the wash area 810 using the wand 806. The used wash solution is collected and the dirt separated therefrom using the screens 811. The screened used wash solution is then pumped to the inlet 21 of the recycling apparatus using the pump 812 and line 814 in a continuous loop.

During operation, it has been found that the pH of the recycled wash solution can vary. Preferably, the recycling apparatus comprises a pH monitor 83 which monitors the pH of the recycled wash solution in the recycled wash solution tank 8 using the probe 87. If the pH is too high, the pH monitor adds phosphate to the recycled wash solution tank 8 via phosphate inlet 88 until the desired pH is reached. The pH can also be monitored and adjusted manually if no pH monitor is present. Preferably, the pH of the wash solution in the recycled wash solution tank 8 is maintained such that it is high enough to avoid causing significant rust on the part being cleaned and low enough to provide sufficient cleaning. It has been found that when phosphate is used, the pH should be between 4.5 and 6.5, more preferably between about 5 to about 6, and most preferably about 5.5 to provide sufficient cleaning and avoid causing significant rust on the part being cleaned. These pH ranges apply to a powder coating process utilizing phosphate. If other chemicals are used, or different cleaning techniques are utilized, the pH can easily be tailored to any desired range by using common techniques of adding bases to increase the pH and acids to decrease the pH.

The pH monitor 83 preferably has a digital readout of the pH or setpoint. This will allow for high accuracy in maintaining the appropriate acidity necessary to properly clean the product to be serviced. While this example uses phosphate, other pH adjusting chemicals can be used as desired for the particular application.

Any phosphate suitable for spray washing for powder coating applications can be used. The type of phosphate used will usually depend on the hardness of the water as it varies by geographic location. The was solution can also contain conventional cleaning agents, such as molybdates, if desired.

Figure 7:
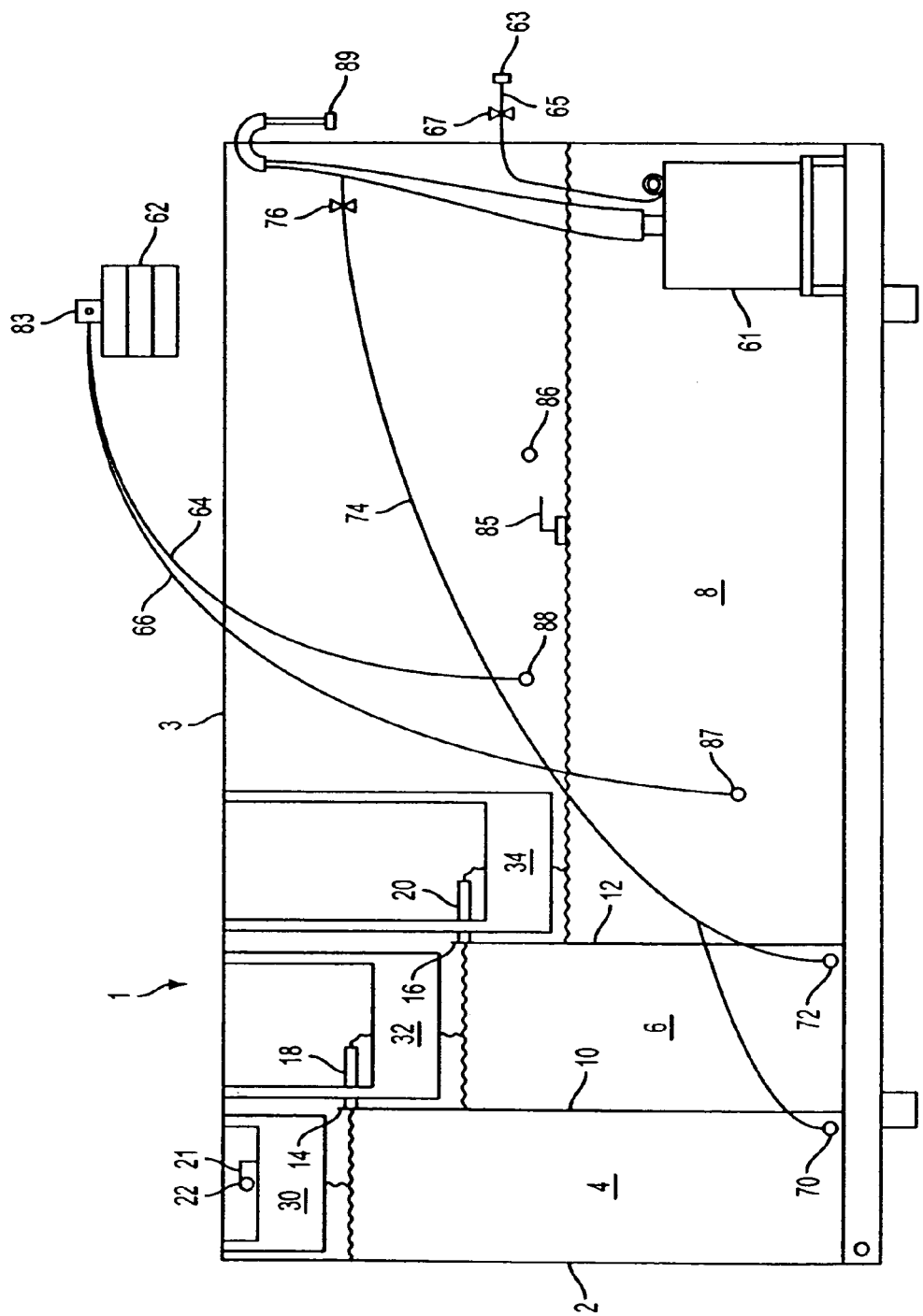
FIG. 7 illustrates a side view of another embodiment of the recycling apparatus.

FIG. 7 illustrates a preferred embodiment in which no high-voltage electricity is utilized in the recycling apparatus 1 to provide enhanced safety. In place of the electrically driven sump pump 60 a pressurized air operated pump 61 is utilized. Commercial examples of suitable air operated pumps 61 include those sold under the Ingersoll-Rand ARO line, such as the Model 6660. The air operated pump 61 is preferably mounted inside the recycled wash solution tank 8 so that if there are any leaks in the pump 61 they will be contained. However, if desired, the pump 61 can be mounted external to the recycling apparatus 1. The pump 61 is powered by pressurized air supplied by line 65 and pressurized air connector 63 from an air compressor (not shown). Conventional powder coating operations usually utilize an air compressor that can be easily tapped to power the pump 61. The speed of the pump 61 can be regulated by the regulator 67. The regulator 67 can contain an air filter if desired. The pump 61 operates in the recycling apparatus 1 in the same manner as the pump 60 as described herein above.

Also shown in FIG. 7, is the preferred arrangement of the pH meter 83 being located on the phosphate tank 62 and having a pump associated therewith. When the pH meter 83 detects that the pH level is too high by the probe 87 connected by line 66, phosphate is pumped from the tank 62 to the recycled wash solution tank 8 via line 64 and inlet 88 until the desired pH is reached.

The lid 3 covers the main tank 2 and is preferably of a see-thru type material to allow easy visual inspection of the filter assemblies and the fluid levels during operation. The lid 3 can be one solid piece or multiple pieces so that access to each holding tank can be separately obtained. The lid 3 can be hinged if desired, but is preferably slidably mounted or mounted to be lifted off to allow easy and safe access to the filters and the separator areas.

The recycling apparatus and method described herein is environmentally friendly. Bacterial and fungus buildup in the recycling apparatus is substantially avoided without the use of environmentally unfriendly chemicals by a combination of the see through lid that allows light to enter, the continuous aeration in each of the tanks 4, 6 and 8, and filtering. The phosphate, which is the same type (only stronger) as used in laundry and dish washers as a cleaning and disinfecting agent, will help kill the bacteria. Furthermore, the high temperature achieved in the power washer will kill even more bacteria.

Before I designed the present recycling apparatus, I was using 15,000 to 18,000 gallons of water and 125 to 175 gallons of phosphate per month in the process of powder coat painting. Now I use about 1,500 gallons of water and about 5 to about 10 gallons of phosphate per month. I currently recommend that the about ½ of the wash solution be replaced each month. However, I have run the recycling apparatus up to 3 months without removing any wash solution from the recycling apparatus, even under heavy use. The time between such replacement will vary depending on the use of the recycling apparatus.

The state of Colorado is currently in an extreme drought condition and the land my business is located on does not accommodate leaching a large amount of water discharge through the sewage leach field. Public sewage is not at this time within reach. With my new recycling apparatus, the wastewater and the drought are no longer an issue.

FIGS. 8–20 illustrate a further embodiment of the invention which utilizes a retaining container 104 and removable tanks 150, 160, and 170.

Figure 8:
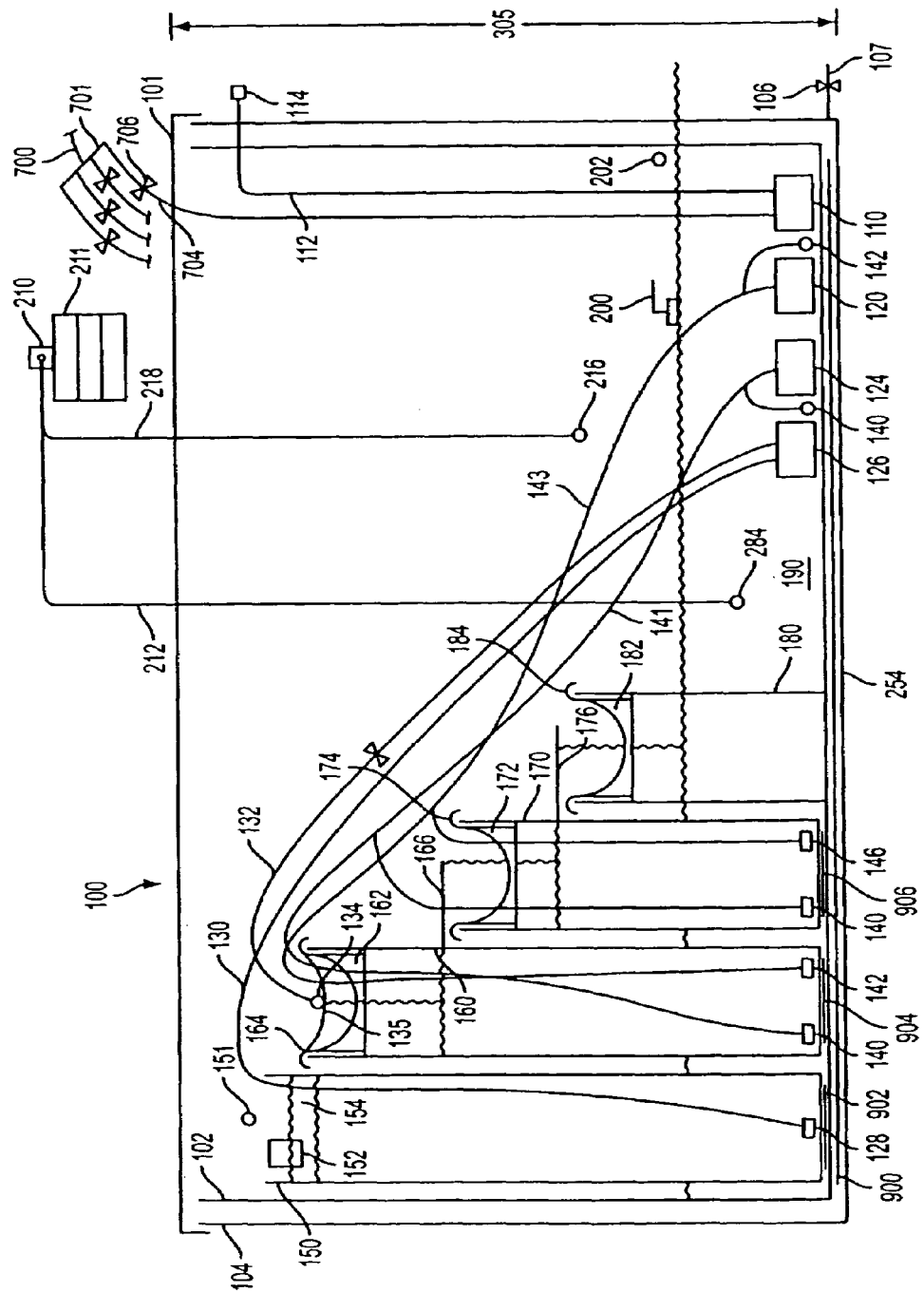
FIG. 8 illustrates a side view of a further embodiment of the recycling apparatus.
Figure 9:
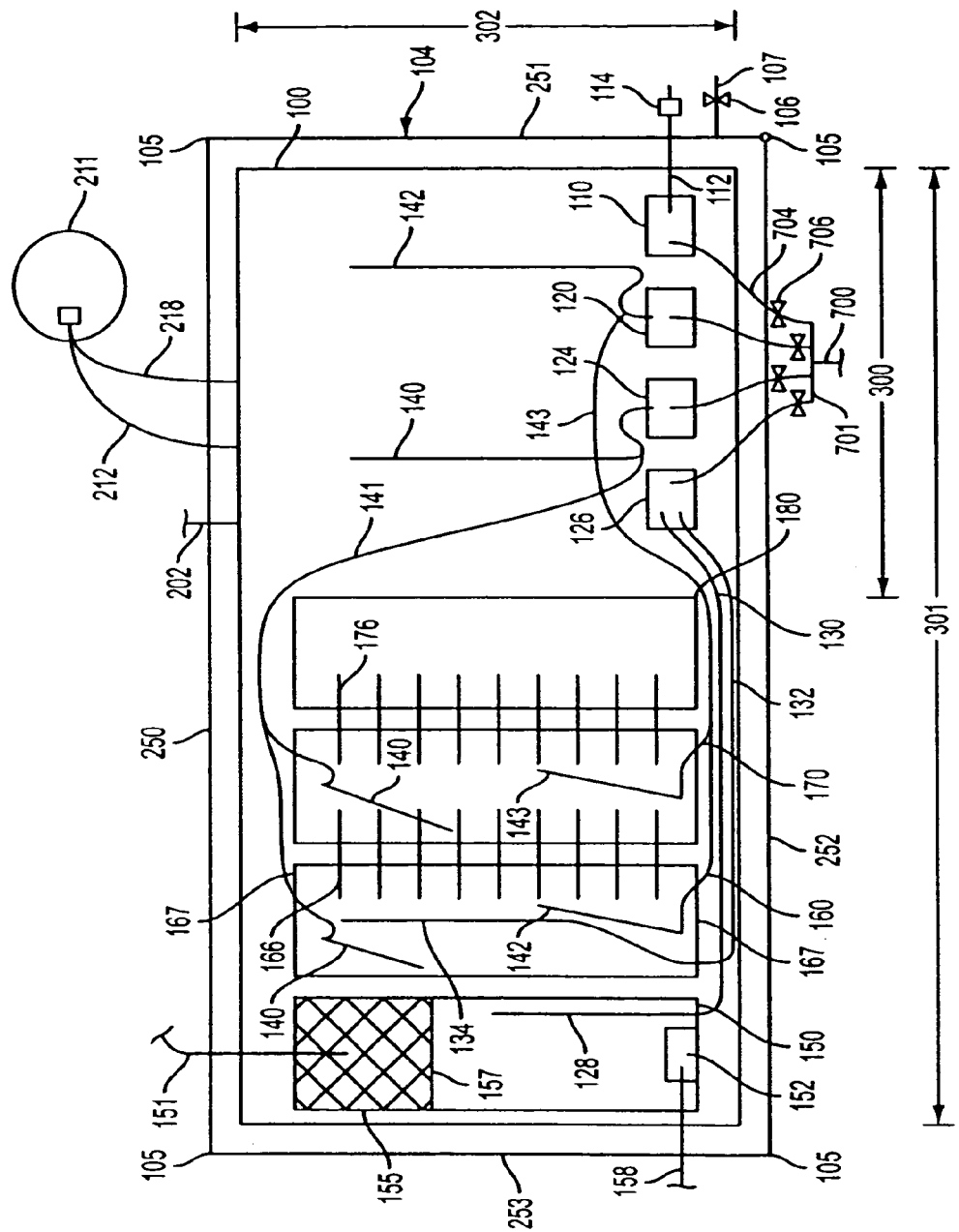
FIG. 9 illustrates a top view of a further embodiment of the recycling apparatus.

As shown in FIGS. 8 and 9, the recycling apparatus 9 comprises a main tank 102 that is about 9 feet wide 302, about 6 feet high 305, and about 12 to about 20 feet long 301. If the recycling apparatus is wider than 9 feet, preferably it is structure such that one dimension is 9 feet or less so that it can be shipped without using the more expensive wide load requirements. The exemplary main tank 102 is sized to operate with one to five standard spray washer operating at about 5 gallons per minute. The main tank 102 can be sized for any desired flow rate and number of spray washers.

The main tank 102 is constructed of reinforced 14 gauge mild steel, but can be constructed of any desired material that is suitable to hold the used wash solution. Wash solutions are well-known and any conventional wash solution can be used in the present recycling apparatus. The wash solution is usually acidic. A preferred wash solution contains phosphate. Examples of suitable materials to hold the wash solution include, but are not limited to, metals, alloys, rubbers, plastics, glass, coated wood, or fiberglass.

Figure 17:
FIG. 17 illustrates a side view of a main tank.

The main tank 102 is reinforced by folding the sheet metal over to form a top edge 600 as shown in FIG. 17. The sides are also reinforced with angle iron 601 to reduce any bowing of the sides caused by the weight of the wash solution contained therein during use. Depending on the size of the recycling apparatus, more or less reinforcing may be needed to reduce bowing of the sides.

Figure 18:
FIG. 18 illustrates a side view of a protecting tank.

The main tank 102 is surrounded on all four sides and the bottom by a protecting tank 104, which has side panels 250, 251, 252 and 253 a bottom panel 254. The protecting tank 104 is designed to retain any leaks in the main tank 102 and to protect the main tank 102 from damage, such as from vehicles hitting the sides. The exemplary protecting tank 104 is formed from 14 gauge steel, but can be formed from any suitable material. As shown in FIG. 18, the protecting tank 104 is reinforced using the top angle iron 620 and a side angle iron 622. The amount of reinforcing can be increased or decreased as needed to prevent bowing. The protecting tank 104 preferably contains a drain 107 and drain valve 106.

Figure 19:
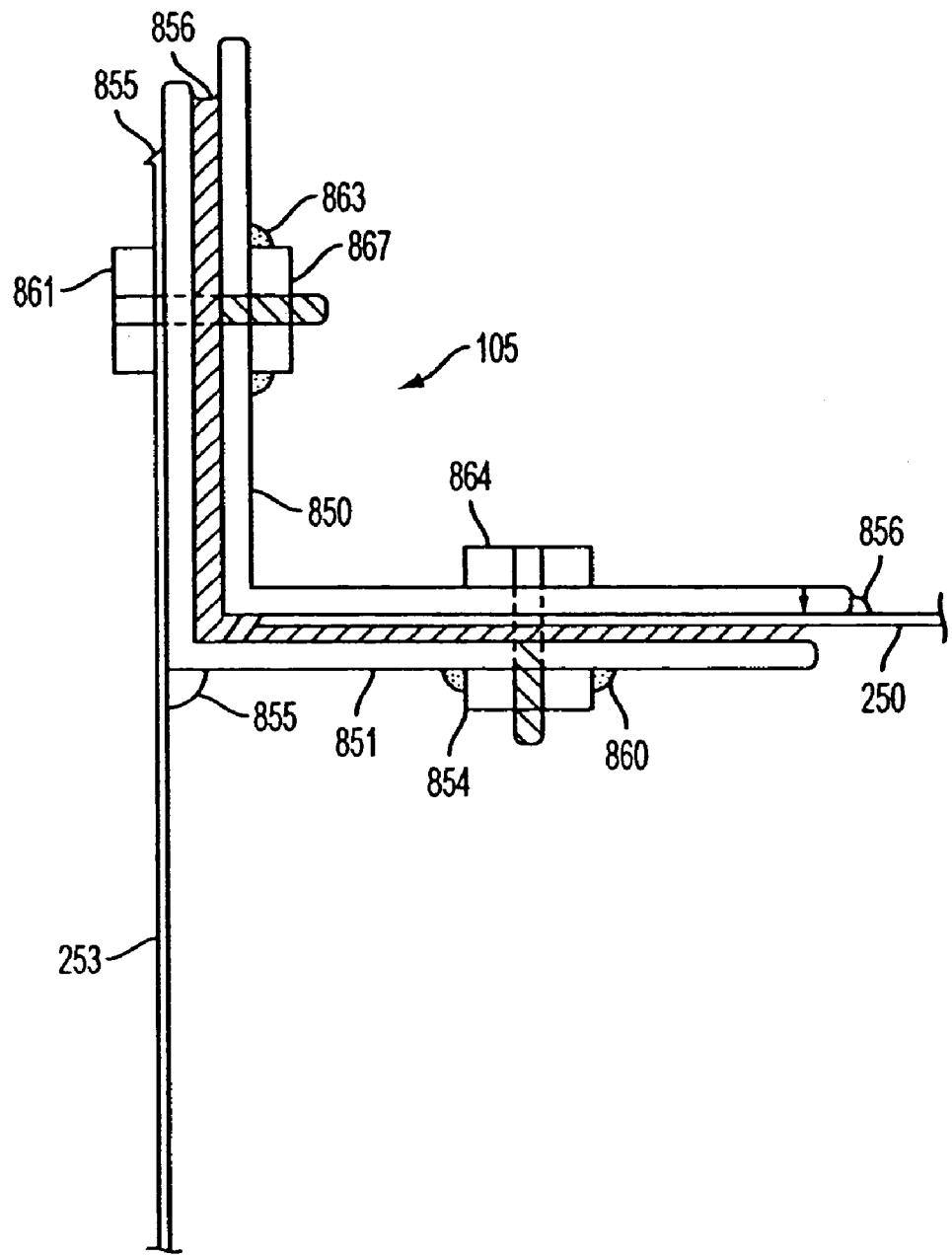
FIG. 19 illustrates a cutaway view of a corner seam on a protecting tank.

The protecting tank 104 is designed such that if any side panel 250, 251, 252, or 253 is damaged it can easily be replaced. As shown in FIG. 19, the side panel 253 is welded to one side of a 2 inch angle iron 851 by welds 855, which travel the length of the angle iron 851 to prevent leaks. The side panel 253 contains holes through which the bolts 861 can pass. The angle iron 851 contains nuts 859 welded thereto by welds 860. The side panel 250 is welded to another 2 inch angle iron 850 by welds 856 that travel the length of the angle iron 850 to prevent leaks. The side panel 250 contains holes through which the bolts 864 can pass. The angle iron 850 contains nuts 867 welded thereto by welds 863. The nuts 867 are arranged to accept bolts 861 and the nuts 859 are arranged to accept bolts 864 when the panels 250 and 253 are in alignment. In this manner a leak proof seal is formed at each corner of the holding tank 104.

The tanks 102 and 104 are powder coated with epoxy paint to prevent rust. To reduce wear during use, a cushion 900 is located between the tank 102 and tank 104. The cushion can be any suitable material, such as plastics, rubbers or wood. A layer of plastic pipes is also suitable.

The main tank 102 is split into four separate tanks for holding the wash solution by three removable tanks, oil separator tank 150, first holding tank 160 and second holding tank 170. A recycled wash solution tank 190 surrounds the three removable tanks and is defined by the outside surfaces of the tanks 150, 160 and 170 and by the inside surface of the main tank 102.

The removable tanks can be formed from the same material as the main tank 102, or any material suitable to hold wash solution. If desired, separate tanks can be used instead of splitting one large tank into smaller tanks with the use of baffles. However, the use of one large tank as shown in the drawings is preferred.

The oil separator tank 150 is formed from 14 gauge steel, but can be formed from any suitable material. The tank 150 is about 2 feet wide, 8 feet long and about 6 feet high. The sides of the tank 150 are reinforced in a manner similar to the first holding tank 160 shown in FIG. 16, and described below.

Figure 14:
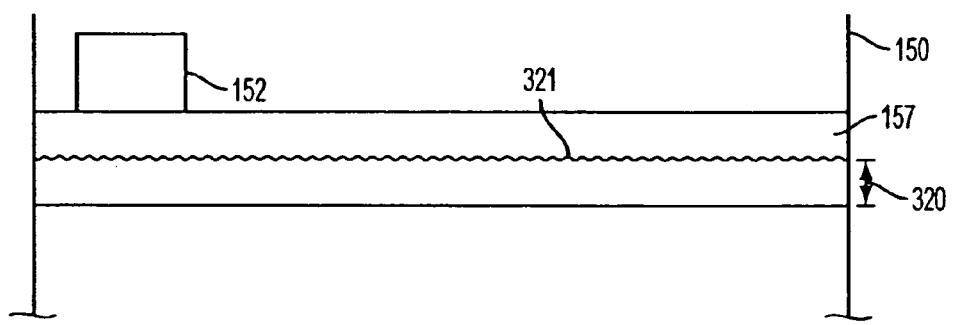
FIG. 14 illustrates a cutaway side view of an oil separator tank.
Figure 15:
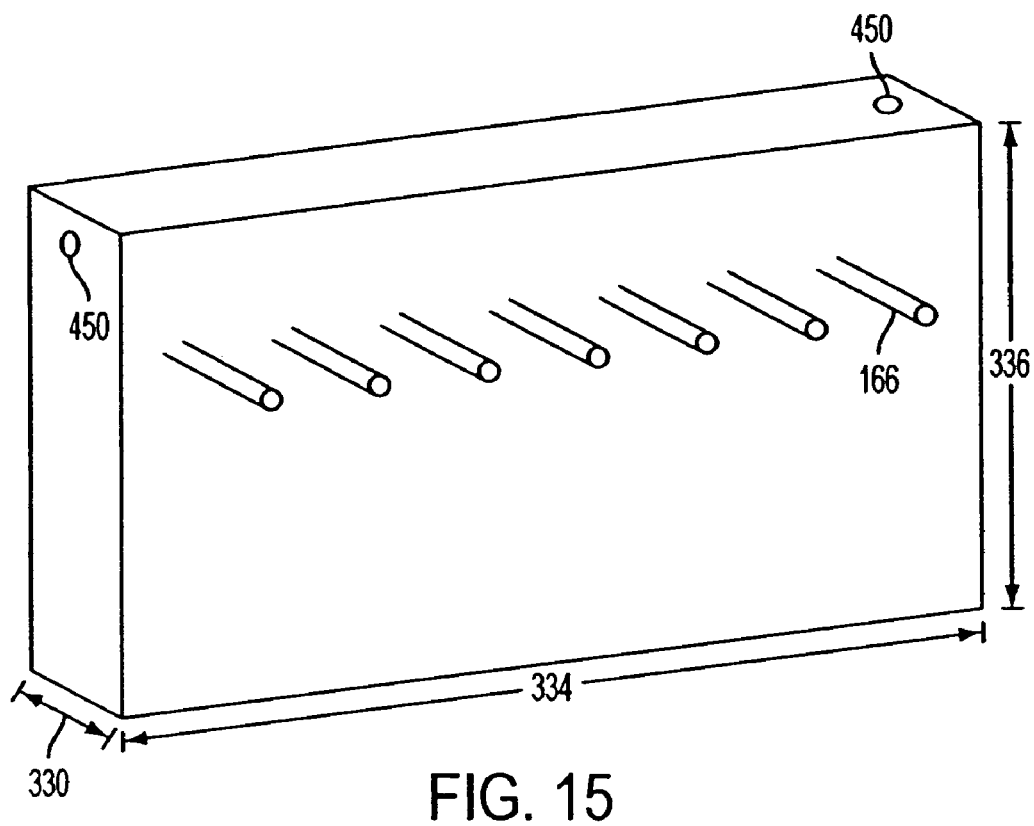
FIG. 15 illustrates a view of a holding tank.
Figure 16:
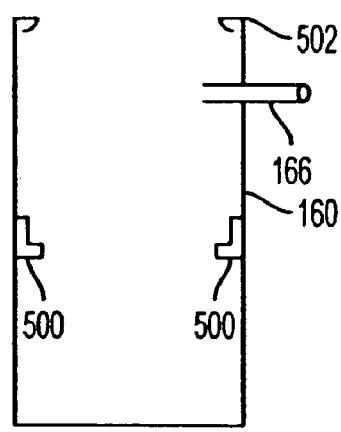
FIG. 16 illustrates a cutaway side view of an oil separator tank.

The oil separator tank 150 has a mesh 155 to catch dirt and large particles. As shown in FIG. 14, a wave suppressor 157 is present in the tank 150 to prevent waves caused by inflow of used wash solution through line 151 from reaching the oil skimmer 152. The wave suppressor 157 is a 4 inch high sheet metal that sits about 1 to 2 inches below the surface of the used wash solution, shown at 320, during operation. Oil skimmed from the surface by the oil skimmer 152 during operation can be pumped to a waste drum by the line 158.

The holding tanks 160 and 170 are formed from 14 gauge steel, but can be formed from any suitable material. The tanks 160 and 170 are each about 8 feet long 334 and 3 feet wide 330. The tank 160 is about 6 feet high. The tank 170 is about 12 inches less in height than the tank 160. The tanks 160 and 170 have associated pipes 166 and 176 respectively. The length of the pipes 166 is such that they empty at about the center axis of the tank 170 to evenly distribute the wash solution over the filter assembly 172, when the tanks 160 and 170 are in position in the main tank 102. Similarly, the pipes 176 have a length such that when the tank 170 and filter assembly 182 are in position in the main tank 102, the pipes 176 empty wash solution from the tank 170 into the central axis of the filter assembly 182 to evenly distribute the wash solution over the filter assembly 182. The pipes 166 and 176 are about 1 inch in diameter and protrude about 1.5 feet from the side of the tank. The pipes 166 and 176 are spaced to distribute the wash solution over the length of the filter. The number of pipes 166 and 176 can be varied as desired. The pipes 166 and 176 can be replaced with any suitable conduit for trough for directing the flow of the wash solution to the associated filtering assembly. The tanks 160 and 170 can optionally have a lifting hole 450 if desired to facilitate lifting of them out of the main tank 102 during maintenance.

The tanks 160, 170 and 190 are preferably powder coated if they are made of a material that can rust, such as mild steel. During operation, the recycling apparatus may have vibrations. To reduce the wear on the powder coating surface, cushions 902, 904 and 906 are installed between the tanks 160, 170 and 180 and the inside surface of the main tank 102. The cushions can be formed from any material suitable to reduce wear, such as plastics, rubbers, or wood. A layer of plastic pipes have been used for this purpose.

Each tank 160, 170 and 190 has an associated filter assembly 162 172 and 182. Three tanks and filter assemblies is the preferred arrangement. However, if more filtering is desired, the number of tanks and associated filter assemblies can be increased. While not preferred, if less filtering is desired, the number of holding tanks can be reduced to one.

Figure 11:
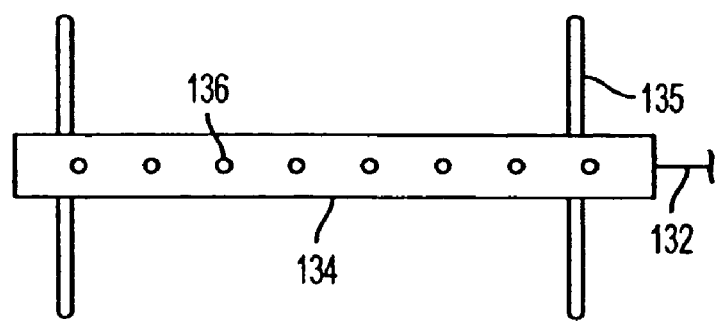
FIG. 11 illustrates a view of a distributing pipe.
Figure 12:
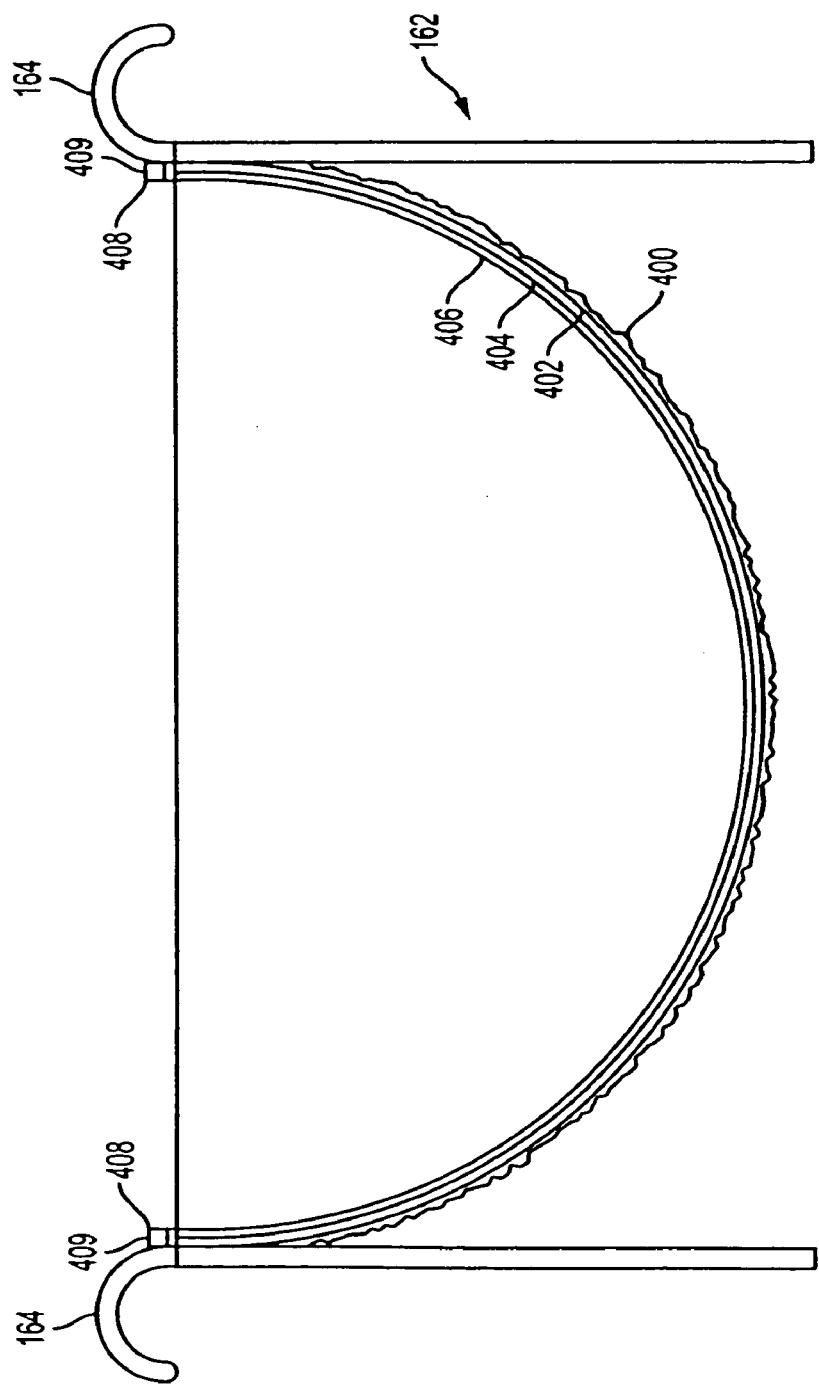
FIG. 12 illustrates a cutaway side view of a filter assembly.
Figure 13:
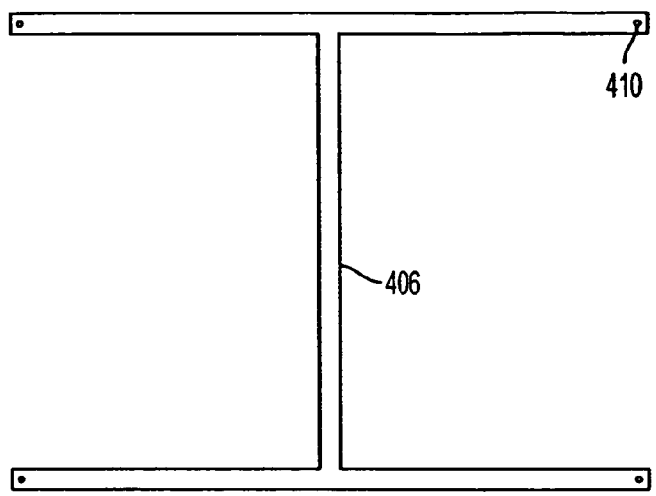
FIG. 13 illustrates a top view of a bottom strap for holding a filter.

Oil reduced wash solution is supplied from the bottom of the bottom of the oil separator tank by entering the intake 128, flowing through line 130, first pump 126, line 132 and then being distributed by a distributing pipe 134 over the filter assembly 162. As shown in FIGS. 8 and 11, the distributing pipe 134 is about 7 feet in length, about 1 inch in diameter and has a plurality of drain holes 136 spaced the length that are about ¼ to about ⅜ inch in diameter. The distributing pipe 134 is supported by supports 135 that rest on a top surface of the filter assembly 162 during operation. The size and length of the distributing pipe 134 and the size and number of drain holes 136 can be varied as desired for the particular application. Preferably, the distributing pipe 134 is constructed to evenly distribute the used wash solution over the filter assembly 162 to maximize the life of the filter. The end of the distributing pipe 134 can be capped or left open as desired. The distributing pipe 134 can be formed from any material that is suitable for holding wash solution.

The first pump 126 is preferably an air driven diaphragm type pump. The pump 126 is connected to a pressurized air source by the distribution tee 701 and has an associated valve and filter 706 to regulate the flow of wash liquid. While an air pump is preferred, any type of pump can be used as desired. The pump 126 is preferably contained within the tank 190 so that if a leak occurs in the pump 126 or associated line it will be contained in the tank 190.

The pipes 166 and 176 are staggered in height, with the height of pipes 166 being higher than pipes 176 so that the wash solution level in tank 160 is higher than the wash solution level in tank 170 and the wash solution level in tank 170 is higher than the wash solution level in tank 190.

Each tank 160 and 170 has an associated filter assembly 162 and 172. The filter assemblies 160 and 170 are sized to removably fit within their respective tank, as shown in FIGS. 8 and 9. As shown in FIGS. 8, 9, 12, and 13, the filter assembly 162 comprises 2 inch expanded steel mesh 400, a ⅛×1 inch I-shaped strap 402 that can be welded to the steel mesh 400, a filter 404, and two ⅛×1 inch straps 406 at each end of the filter assembly 162. The filter 404 is held in place by fastening the straps 406 to the I-shaped strap 402 using bolts 410. While the use of bolts and straps are shown in the Figures, the filter can be held in place using any suitable means, such as clamps, clasps, screws, and ties. An optional top clamp is shown at 409 that is held in place by bolts 408. The ends of the filter assembly 162 are sealed using plates 167. The filter assembly 162 is removably held in place within tank 160 using the arms 164 by gravity such that the filter assembly can easily be raised out of the tank, or held in place by using any suitable fastening means, such as bolts, screws, clasps and clamps. Alternatively, instead of arms 164, the filtering assembly 162 can rest on stops placed in the tank 160 to hold it in place. The filter assemblies 172 and 182 have the same construction as the filter assembly 162 with respective arms 174 and 184.

The filter assembly 182 is held in place by a rack 180 mounted in the main tank 102. The filter assembly 182 sits in the rack 180 and is held in place using arm similar to those shown at 164 in FIG. 12.

The height of the tanks 160 and 170 and pipes 166 and 176 should be such that during operation wash solution flows from the pipes 166 and 176 into the respective filter assemblies and filtered wash solution drops from the filter assemblies into their respective tanks by gravity feed.

The filter assemblies and tanks are constructed and arranged such that during operation, the filtered wash solution drops about 1 inch to 30 inches, more preferably from about 2 inches to about 24 inches, more preferably from about 3 inches to about 12 inches, and most preferably about 6 to about 8 inches, before contacting the surface of the wash solution in the respective tank to provide aeration. The height of the filtering assembly can easily be adjusted by adjusting the height of the tank and/or adjusting the length of the arms 164.

The size and structure of the filter assembly can be varied as desired. Preferably, the size of the filter should be such that at least a 5 gallon per minute flow rate is provided under ambient pressure and gravity, and more preferably at least a 20 gallon per minute flow rate is provided.

The preferred filter assembly shown uses a flat rolled filter 404, which can be purchased in spools three feet wide and 150 feet long and easily cut to the proper length. The filters usually last about 1 week in duration before changing is required, but should be monitored daily. To change the filter in filter assembly 162, the filter assembly 162 is lifted out of tank 160, or can be changed while still in the tank 160 if desired.

Once the filter assembly is out of the tank, the filter 404 can be easily replaced by removing the bolts 410 and lifting the used filter 404 out the filter assembly. A new filter 404 can be easily cut to the proper length from a spool of filter, placed in the filter assembly, and securely mounted using the straps 406 and bolts 410. The filter assembly can be easily replaced in the tank by reversing the steps for removing the filter assembly.

The filter 404 is inexpensive and easily obtained from commercial manufacturers or from a filter supply company. The spool is usually three (3) feet wide and one hundred fifty (150) feet long. Examples of commercially available filter materials include, but are not limited to, the BR-60 and BR-80 series from Mountain States Filter, Colorado.

The filter can be selected by the end user to provide the desired level of filtering based on the particular application. It has been found that filters having a size of less than 10 microns are suitable. A preferred arrangement is the use of a filter having a size of about 3 to 8 microns in the filter assembly 162, and about 1 microns or less in each of the filter assemblies 172 and 182. However, the size of the filter can be varied as desired for the particular application.

Figure 20:
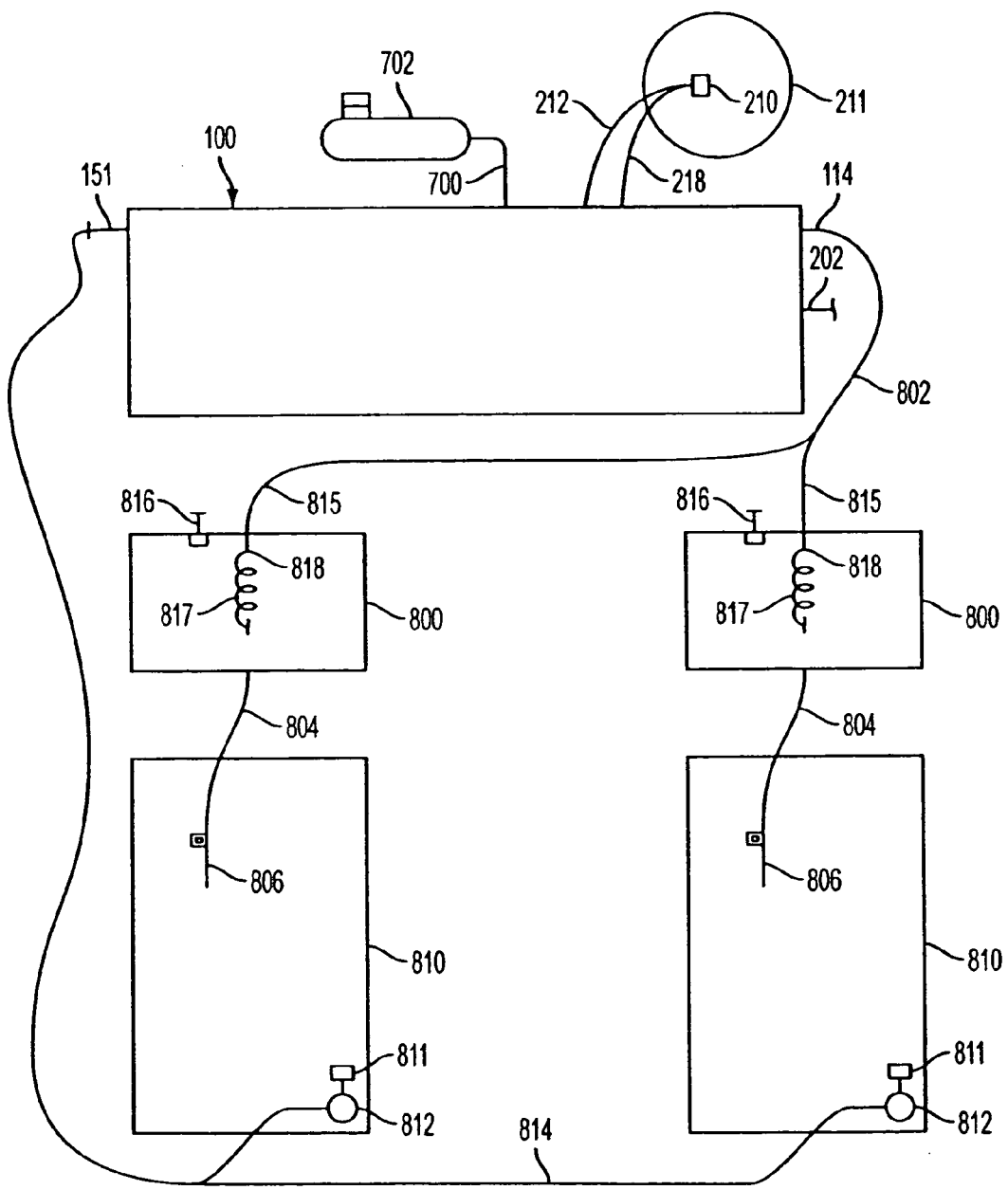
FIG. 20 illustrates a spray wash assembly utilizing a recycling apparatus.

The recycled wash solution tank 190 contains the filtered recycled wash solution that can be reused in a spray washer. As shown in FIGS. 8, 9, and 20, a second pump 110 is located in the recycled wash solution tank 190, which pumps the recycled wash solution to a hose connection 114, to which power washers 800 can be connected via hose 802.

The second pump 110 is preferably an air driven diaphragm type pump. The pump 110 is connected to the distribution tee 700 by line 704 and has an associated valve and filter 706 to regulate the flow of wash liquid. Pressurized air is supplied to the tee 701 by the line 700. While an air pump is preferred, any type of pump can be used as desired. The pump 110 is preferably contained within the tank 190 so that if a leak occurs in the pump 110 or associated line it will be contained in the tank 190.

To prevent sediment buildup in the tanks 160, 170 and 190, third and fourth air pumps 120 and 124 are connected to agitators 140 and 142 via lines 141 and 143 to pump recycled wash solution in tank 190 to the tanks 160,170 and 190. The pumps 120 and 124 are connected to the distribution tee 700 by associated lines 704 and each has an associated valve and filter 706 to regulate the flow of wash liquid. While air pumps are preferred, any type of pump can be used as desired. The pumps 120 and 124 are preferably contained within the tank 190 so that if a leak occurs in the pumps or associated lines it will be contained in the tank 190. Preferably, two pumps 120 and 124 are used in case one pump fails and stops flow to one set of agitators 141 or 142, the other pump will supply flow the other set of agitators and agitate the wash solution in each tank 160, 170 and 190.

Figure 10:
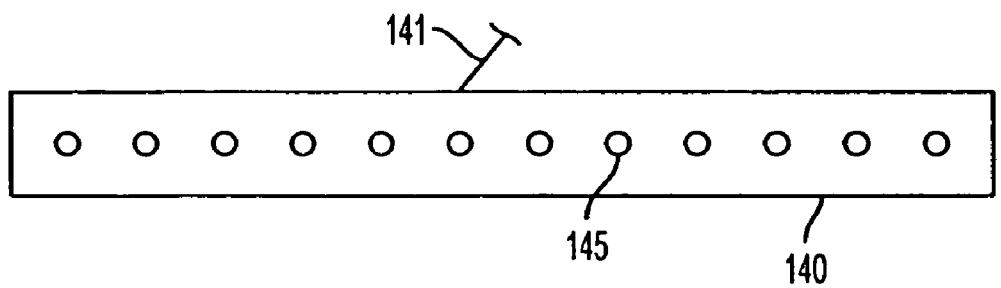
FIG. 10 illustrates a side view of an agitator.

As shown in FIG. 10, the agitators 140 are formed from a 1 inch square pipe that has been capped at both ends. A plurality of ¼ to ⅜ inch holes 145 are spaced the length of the agitators 140. The agitators 142 can be formed in the same manner as agitators 140. When recycled wash solution is pumped into the agitators 140, it is sprayed out of the holes 145 and agitates the wash solution present in the tanks 160, 170 and 190. The agitator 142 works in the similar manner. The size, shape and number of the agitators 140 and 142 can be varied as desired for the particular application. If more agitation is desired, a larger agitator, multiple agitators or smaller holes 145 can be used. If less agitation is desired, a smaller agitator or larger holes 145 can be used. If precipitates form in the recycled wash solution tank 190 they can be pumped into the holding tanks 160 and/or 170 via the agitators 140 and 142 and then caught by the respective filter assemblies. The agitators can be run continuously, even when the spray washer is not used, to remove undesirable precipitates and prevent sediment buildup in the tanks.

If desired, wash solution from the holding tank 170 can be used to supply the agitators 140 and 142 in the holding tank 160. However, recycled wash solution from tank 190 is preferably supplied to at least one of the agitators in the tanks 150, 160 or 170 so that if precipitates form in the recycled wash solution in tank 190 they can be filtered by any of the filter assemblies 162, 172 or 182.

The recycled wash solution in tank 190, and tank 8 as described above, may form liquid and sediment layers over time. To prevent these layers, the recycled was solution can be stirred once a day and/or an agitator or stirrer can be added to tanks 8 and 190. Furthermore, the recycled wash solution in tanks 8 and 190 can be withdrawn from a location off the bottom of the tanks 8 and 190 to reduce clogging from sediment, such as about 1 to 6 inches, more preferably about 2 to about 4 inches, from the bottom.

The recycling apparatus 100 preferably contains a water level monitor 200 in the recycled wash solution tank 190 to alert the user of low wash solution conditions. If desired, the water level monitor 200 can be connected to a water supply to automatically add water to the recycled wash solution tank 200 through inlet 202 as needed. The water level monitor 200 can be any conventional water level monitor, such as commonly used in toilets or the well-known water levelers used in the commercially available Swamp Cooler™.

During operation, the recycling apparatus 100 is connected to power washers 800 using hose 802. The pump 110 pumps recycled wash solution to the power washers 800 at a pressure of about 5 pounds per square inch (psi) or greater. The capacity of the pump 100 can be adjusted to match the input pressure requirements of the number and type of spray washers being utilized. The power washers 800 heats the wash solution to any desired pressure and temperature, for example, about 180 to about 220° F. and about 1500 to about 3000 psi. The object to be washed is sprayed with the heated pressurized wash solution in the wash areas 810 using the wands 806. The used wash solution is collected and the dirt separated therefrom using the screens 811. The screened used wash solution is then pumped to the inlet 151 of the recycling apparatus using the pumps 812 and line 814 in a continuous loop.

During operation, it has been found that the pH of the recycled wash solution can vary. Preferably, the recycling apparatus comprises a pH monitor 210 located on the phosphate tank 211 and having a pump associated therewith which monitors the pH of the recycled wash solution in the recycled wash solution tank 190 using the probe 214. If the pH is too high, the pH monitor adds phosphate to the recycled wash solution tank 190 via phosphate inlet 218 until the desired pH is reached. However, the pH can also be monitored and adjusted manually if no pH monitor is present.

Preferably, the pH of the wash solution in the recycled wash solution tank 190 is maintained such that it is high enough to avoid causing significant rust on the part being cleaned and low enough to provide sufficient cleaning. It has been found that when phosphate is used, the pH should be between 4.5 and 6.5, more preferably between about 5 to about 6, and most preferably about 5.5 to provide sufficient cleaning and avoid causing significant rust on the part being cleaned. The pH can be easily measured using well-known litmus strips or electronic pH measuring equipment. These pH ranges apply to a powder coating process utilizing phosphate. If other chemicals are used, or different cleaning techniques are utilized, the pH can easily be tailored to any desired range by using common techniques of adding bases to increase the pH and acids to decrease the pH.

The wash solution can be monitored for phosphate concentration using a titration test. The test can be conducted using commercially available kits comprising reagents, beakers and droppers with instructions on how to use the reagents to measure the phosphate concentration. If the phosphate concentration is too high, water can be added, or conversely, if the phosphate concentration is too low, phosphate can be added. The concentration of phosphate will vary for the particular application. The amount of phosphate should be low enough to avoid leaving a visible residue on the cleaned part and high enough to provide sufficient cleaning. Suitable amounts of phosphate may vary with the hardness of water used and other chemicals present. Suitable phosphate concentrations, for example, are less than 4%, preferably 2 to 2.5% by volume based on the total volume of the wash solution. However, one skilled in the art will easily be able to determine a suitable phosphate concentration based on the disclosure provided herein.

Preferably, no high-voltage electricity is utilized in the recycling apparatus 100 to provide enhanced safety. In this regard, the pumps 110, 120, 124 and 126 are all pressurized air operated pumps. Commercial examples of suitable air operated pumps include those sold under the Ingersoll-Rand ARO line, such as the Model 6660. The air operated pumps are preferably mounted inside the recycled wash solution tank 190 so that if there are any leaks in the pump 61 they will be contained. However, if desired, the pumps can be mounted external to the recycling apparatus 100. Conventional powder coating operations usually utilize an air compressor that can be easily tapped to power the pumps.

The lid 101 covers the main tank 102 and protecting tank 104 and is preferably of a see-thru type material to allow easy visual inspection of the filter assemblies and the fluid levels during operation. The lid 101 can be one solid piece or multiple pieces so that access to each holding tank can be separately obtained. The lid 101 can be hinged if desired, but is preferably slidably mounted or mounted to be lifted off to allow easy and safe access to the filters and the separator areas. Preferably, the lid 101 does not form an airtight seal in the main tank 102 so that the pressure in the main tank 102 can equalize with the ambient air pressure.

Conventional spray washers 800 have two inputs, fresh water input 815 and chemical input 816. However, when the present recycling apparatus is utilized, the recycled wash solution containing chemicals is supplied to the spray washer 800 through the fresh water input 815. The chemical input 816 and associated metering unit 817 can be removed since they are no longer needed, which usually results in a desired increase of pressure at the spray wand 806. By using the present recycling apparatus, a less complicated spray washer 806 can be utilized that does not have a chemical input 816 and metering unit 817 since the chemicals can be added to the recycling apparatus.

The coil for heating fresh water in the spray washer 800 usually consists of black pipe 817 and brass fittings 818, which can be corroded by the chemicals present in the wash solution. Thus, preferably, if present, the black pipe 817 and brass fittings 818 are replaced with stainless steel or another material that does not corrode in the presence of the chemicals.

Galvanized materials should not be spray washed when using 1 micron or larger size final filters in the recycling apparatus since the concentration of zinc can undesirably build up in the recycler and cause a hazardous situation. Galvanized materials should only be spray washed under extreme caution to monitor and remove zinc from the recycling apparatus.

However, it has now been found that when using a 0.2 micron final stage ($2^{nd}$ stage and/or $3^{rd}$ stage in 3 stage recycling apparatus) filter, surprisingly zinc and other heavy metals such as lead and molybdenum were removed from the wash solution. Thus, galvanized materials, and other materials containing heavy metals, can now be safely power washed without causing hazardous buildup of heavy metals in the wash solution. Furthermore, to make the present process even more environmentally friendly, the used filters containing the heavy metals can be air dried and the combined with scrap powder paint swept up from the floor and fired in the powder coating oven to form a brick that binds up the heavy metals. In this process, heavy metals are not washed down city sewers nor disposed of in a manner in which free heavy metals can contaminate ground water or soil. The 0.2 micron final stage filter made the wash solution so clear in the recycling apparatus that the floor of the tank was clearly visible through the wash solution. The 0.2 micron final stage filter also removed bacteria. A preferred setup, is a 3 to 5 micron filter for the first stage, and 1 micron or 0.2 micron filters for the second and third stages depending on what material is being washed.

The recycling apparatus and method described herein is environmentally friendly. Bacterial and fungus buildup in the recycling apparatus is substantially avoided without the use of environmentally unfriendly chemicals by a combination of the see through lid that allows light to enter, the continuous aeration in each of the tanks and filtering. The phosphate, which is the same type (only stronger) as used in laundry and dish washers as a cleaning and disinfecting agent, will help kill the bacteria. Furthermore, the high temperature achieved in the power washer will kill even more bacteria.

A common test used to detect potential coating failures caused by salts remaining on the surface of the part to be coated after spray washing is described in Frauman, AEffects of impure rinse water on coating performance, @Morton Powder Coatings brochure. The peel resistance test comprises:

1. Pre-treat, coat and cure a small representative test panel, taking care to ensure the powder coating is applied and cured consistent with the manufacturer's recommendations.

2. Immerse half of the coated, cured test panel in distilled water for 24 hours at ambient temperature.

3. Remove and towel dry the test panel.

4. After sufficient ambient dwell time to ensure that the coated surface is dry, complete, cut a cross hatch pattern in the powder coating with a knife and apply tape. Pull the tape from the panel and observe if any pant was removed with the tape.

5. Compare results on subject test panel to past typical performance. If the paint coating separated, the coating failed.

I ran a trial to determine the how long the recycling apparatus could run without changing emptying and refilling with clean water and phosphate chemicals before the parts were not sufficiently cleaned. A recycling apparatus 1 as shown in FIG. 1 was run for 1.5 months, during which I used bout 2000 gallons of water and about 10 gallons of phosphate chemicals. Without the recycling apparatus, I would have used about four to five 55-gallon drums of phosphate over this time period and about 15,000 to 18,000 gallons of water.

Over the 1.5 month period, I noticed that significant amount of salts precipitated in the filters, which were changed twice a week. I believe the combination of acid and aeration caused the salts to precipitate out of the wash solution and be trapped in the cloth filters. However, the claimed invention is not limited to this theory as to why the salt precipitates out of solution in my apparatus. This precipitation caused the salt concentration to remain low enough during this 1.5 month run that there were no visible salt deposits on parts cleaned using the recycled wash solution. Salt deposits can adversely affect the bonding of the powder coat to a part.

Each week during the 1.5 month period, I spray washed three by six inch sheet metal panels with the recycled wash solution, after which they exhibited a desired bluish or gold tint with no visible residues or rust. The cleaned panels were powder coated and cured. A knife was used to cut a cross hatch pattern in the powder coated panels and then duct tape was applied. When the duct tape was ripped off of the panels, no paint pulled off with tape. The panels were also struck with a hammer and bent with no visible peeling of the paint. The recycled wash solution provided excellent adhesion of the paint to the panel.

The recycling apparatus was then used for another month without replacing the wash solution present therein, with weekly cross-hatch testing. At 2.5 months, the cross-hatch test failed and the paint peeled from the surface of the panels when the tape was removed. At that time, streaks were seen on the cleaned parts, which were not evident in earlier tests. Over the 2.5 month period I only used about 20 gallons of phosphate chemicals. While the apparatus provided sufficient cleaning with replacement of the wash solution present therein for a period of 2 months and 1 week, I recommend monthly replacements of the was solution present within the recycling apparatus.

Conventional spray washing apparatus do not accurately maintain the pH and phosphate concentration of the wash solution since the phosphate is added along with the fresh water during washing. During use monitoring and adjustment of pH on a fresh water system is very difficult. I have found that too little phosphate and too high of a pH (higher than 6) does not provide adequate washing of the part to be powder coated. Conversely, if too much phosphate is added, the pH will be too low (less than 5) and phosphate remains on the cleaned part. If the part is not cleaned properly or has phosphate deposits thereon, the paint may not adequately adhere to the part and may peel during the peel test described herein above. By using the recycling apparatus, the amount of phosphate and pH can be accurately maintained.

I conducted another test over the last year during which I only used 75 gallons of phosphate. In contrast, without the recycling apparatus I would have used 1,980 gallons of phosphate over that same year period.

The invention has been described for use in recycling wash solutions in spray washing for powder coating applications. However, the recycling apparatus can be used to recycle wash solutions from conventional spray washers, car washes, steam washers and laundry machines. Further, it has been found that the recycling apparatus may remove salt from water and may be useful in removing salt from sea water to provide a salt reduced water which can be further treated, with for example reverse osmosis or other technology, to remove the remaining salt to provide fresh water. Thus, the invention is applicable whenever recycling of water and/or chemicals present in the water is desired.

While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A recycling apparatus for recycling wash solution from a power washer:
    a first holding tank constructed and arranged for holding a first filtered wash solution and having a first outlet through which the first filtered wash solution can flow;
    a first filter assembly in gravity feed relation with the first holding tank and being constructed and arranged such that during operation the wash solution filters through the first filter assembly to form the first filtered wash solution and drops into the first holding tank a first distance of from about 1 to about 30 inches before contacting the first filtered wash solution contained therein, the first distance being sufficient to aerate the first filtered wash solution contained in the first holding tank during operation;
    a recycled wash solution tank constructed and arranged for holding recycled wash solution;
    a second filter assembly comprising a filter having a size of about 10 microns or less in gravity feed relation with the recycled wash solution tank and being constructed and arranged such that during operation the first filtered wash solution flows out of the first outlet and enters and flows through the second filter assembly to form the recycled wash solution and drops into the recycled wash solution tank a second distance of from about 1 to about 30 inches before contacting a surface of the recycled wash solution being contained therein, the second distance being sufficient to aerate the recycled wash solution contained in the recycled wash solution tank during operation;
    a power washer in communication with the recycled wash solution in the recycled wash solution tank; and
    screen structure constructed and arranged for collecting wash solution sprayed from the power washer during operation and transferring the wash solution to the first filter assembly.

2. A recycling apparatus according to claim 1, further comprising a pump constructed and arranged to provide pressurized recycled wash solution from the recycled wash solution tank of a pressure sufficient to operate the power washer.

3. A recycling apparatus according to claim 1, further comprising an oil separator tank, wherein the oil separator tank comprises an oil skimmer and an intake at a lower portion of the oil separator tank for supplying oil reduced wash solution to the first filter assembly during operation.

4. A recycling apparatus according to claim 3, further comprising at least one agitator in the oil separator tank to prevent sediment buildup.

5. A recycling apparatus according to claim 1, further comprising an agitator in said first holding tank connected to a pump such that during operation recycled wash solution flows from the recycled wash solution tank to the agitator to agitate the filtered wash solution present in the first holding tank.

6. A recycling apparatus according to claim 1, further comprising another filter assembly in gravity feed relation with another holding tank and being constructed and arranged such that during operation the wash solution from the first holding tank flows into the another filter assembly and filters through the another filter assembly to form a second filtered wash solution and drops into the another holding tank a another distance before contacting the second filtered wash solution contained therein, the another distance being sufficient to aerate the second filtered wash solution contained in the another holding tank during operation, and during operation the second filtered wash solution flows from the another holding tank into the second filter assembly in place of the first filtered wash solution.

7. A recycling apparatus according to claim 1, wherein each filter assembly is removable.

8. A recycling apparatus according to claim 1, wherein each filter assembly is adjustable in height such that the distance the filtered wash solution drops into a filtered wash solution being contained in a tank is adjustable.

9. A recycling apparatus according to claim 1, wherein each filter assembly comprises a mesh screen and means for holding a flat sheet filter in place.

10. A recycling apparatus according to claim 9, wherein the filter comprises a sheet of filter material cut to size from a roll of filter material.

11. A recycling apparatus according to claim 1, wherein the tanks have see through lids for monitoring the filter assemblies during operation.

12. A recycling apparatus according to claim 1, wherein the apparatus is constructed of materials suitable for use at a low pH and containing phosphate.

13. A recycling apparatus according to claim 1, wherein each tank has at least one agitator for agitating the wash solution therein and reduce sediment buildup.

14. A recycling apparatus according to claim 1, wherein a distance the filtered wash solution drops from the filter assembly to the wash solution in the respective tank below is from about 2 to about 24 inches.

15. A recycling apparatus according to claim 1, wherein a distance the filtered wash solution drops from the filter assembly to the wash solution in the respective tank below is from about 3 to about 12 inches.

16. A recycling apparatus according to claim 1, wherein a distance the filtered wash solution drops from the filter assembly to the wash solution in the respective tank below is from about 6 to about 8 inches.

17. A recycling apparatus according to claim 1, wherein the first filter assembly has a filter size of about 10 microns or less.

18. A recycling apparatus according to claim 1, wherein the first filter assembly has a filter size of about 3 to 8 microns and the second and filter assembly has a filter size of about 1 microns or less.

19. A recycling apparatus according to claim 1, further comprising a plurality of holding tanks and filter assemblies in communication with the holding tanks.

20. A recycling apparatus according to claim 1, further comprising a means for measuring pH and automatically supplying pH adjusting chemicals to maintain a desired pH in the recycled wash solution during operation.

21. A recycling apparatus according to claim 1, wherein the filter assemblies are sized to provide at least a 5 gallon per minute flow rate under ambient pressure and gravity.

22. A recycling apparatus according to claim 1, further comprising means for automatically adding water to adjust the level of wash solution in the recycled wash solution tank.

23. A recycling apparatus according to claim 1, wherein the power washer is constructed and arranged to accept the recycled wash solution containing both wash chemicals and water in a water inlet of the power washer.

* * * * *